Fig. 1A.

Nov. 28, 1967  H. F. HOBBS  3,354,747
POWER TRANSMISSION APPARATUS
Filed July 22, 1965  8 Sheets-Sheet 2

Fig. 1B.

INVENTOR:
Howard Frederick Hobbs
By Alexander Powell
attorneys

Nov. 28, 1967   H. F. HOBBS   3,354,747
POWER TRANSMISSION APPARATUS
Filed July 22, 1965   8 Sheets-Sheet 4

INVENTOR:
Howard Frederick Hobbs
By Alexander Howell
attorneys

United States Patent Office 3,354,747
Patented Nov. 28, 1967

3,354,747
POWER TRANSMISSION APPARATUS
Howard Frederick Hobbs, 18 Warwick New Road,
Leamington Spa, England
Filed July 22, 1965, Ser. No. 473,985
Claims priority, application Great Britain, July 31, 1964,
30,319/64
16 Claims. (Cl. 74—688)

ABSTRACT OF THE DISCLOSURE

The apparatus has a primary input member 15, an output member or bevel pinion 11, a torque transmitter 19, a secondary planetary gearing 21, clutches 66, 69 and brakes 62, 63. Ratio change is effected by the torque transmitter and by changing the application of the clutches and brakes. The hydro-kinetic device 19 has an impeller 30 and a turbine 31. The impeller 30 is connected to the primary input member 15. The turbine 31 is permanently connected to the input member 39 of a primary gearing. The driven member 45 of the primary gearing is drivably connected to the output bevel pinion 11. The reaction member 50 of the primary gear is permanently connected to the output member 52 of the secondary gearing. There is no other mechanical connected between primary and secondary gearings. The driven parts 66, 69 of the clutches are connected to the input members 53, 56 of the secondary gearing. The clutches have a common housing 72, 73. The driving parts of the clutches are connected to the primary input member 15. The rotating parts of the brakes are connected to the reaction parts 61, 62 of the secondary planetary gearing.

---

This invention relates to variable ratio power transmission apparatus especially for motor vehicles and more particularly to apparatus providing automatic changing of ratio without interruption in transmission of power.

In particular, the invention relates to power transmission apparatus of the kind which provides split torque and having power paths with planetary gearing whereby a primary input torque transmitting device (e.g., a clutch or a hydro-kinetic torque converter) continuously transmits power through one path in said gearing while another path has additional input torque transmitting devices and also provides variable ratios. The input torque passes through the primary torque converter or other input power transmitting device during one phase of operation and during other phases of operation is divided between the paths in variable proportions.

One object of the invention is to enable the input torque transmitting devices to be engageable independently and to be used to provide one ratio and again to provide another thereby reducing the number of elements required for a given number of ratios.

A further object of the invention is to enable a number of mechanical stepped ratios to be simply obtained in order to provide considerable improvement in efficiency, performance and economy and minimizing of changes in momentum because of closer ratio steps which can be economically provided. Changes in momentum and disturbance are related to the squares of the changed ratios and close ratio steps are therefore most desirable.

Another object of the invention is to provide a better bridging action from one ratio to another.

A still further object of the invention is to enable the changing of ratios to be effected with lower heat input and loss.

Another object of the invention is to provide simplified control means for effecting changes of ratio.

According to the invention the apparatus comprises a gearing having at least two planetary gear trains, said gearing having at least three input members, at least two of which serve both as input and reaction members during different phases of forward driving operation.

The three input members may each be provided with a torque transmitting or coupling device to couple the members independently to the source of power. The torque transmitting or coupling devices are able to share the input torque and one or more may be a hydro-kinetic torque converter.

The elements which serve both as input and reaction elements may each be associated with a coupling and a brake. The brakes may be uni-directional or able to operate in a uni-directional manner during driving operation.

The arrangement may be such that when one of the torque transmitting devices or couplings is a torque converter, its reaction element may serve as an input member during some phases of operation.

The invention will now be described by way of example with reference to the accompanying drawings wherein.

Figure 1A:
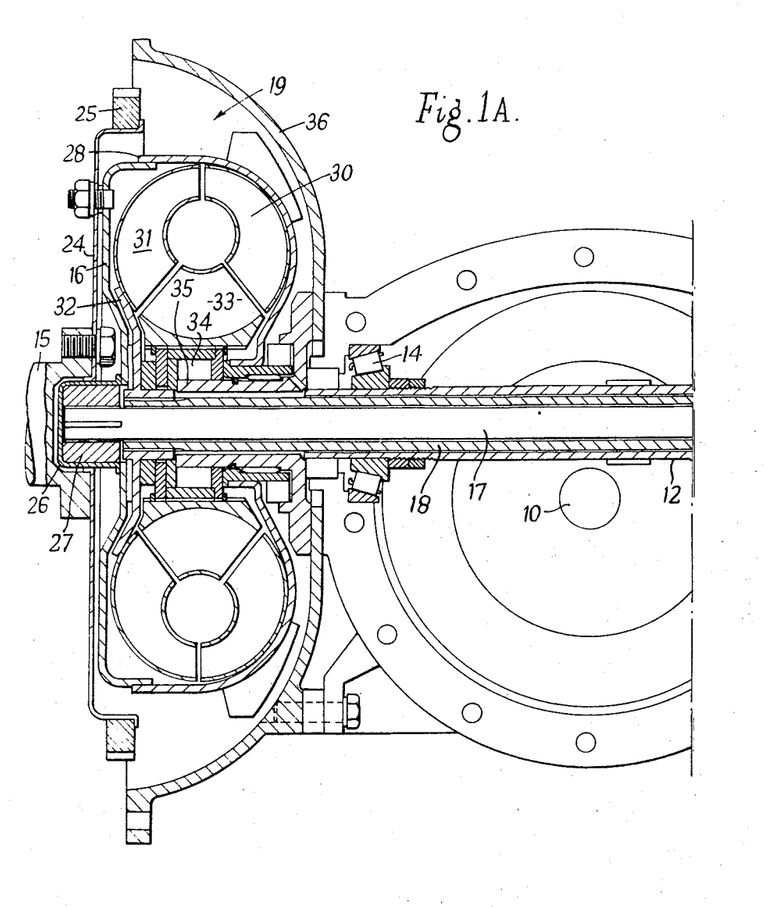
FIGURE 1 is made up of parts A and B, a sectional view of a trans-axle power transmission apparatus made in accordance with the invention.
Figure 1B:
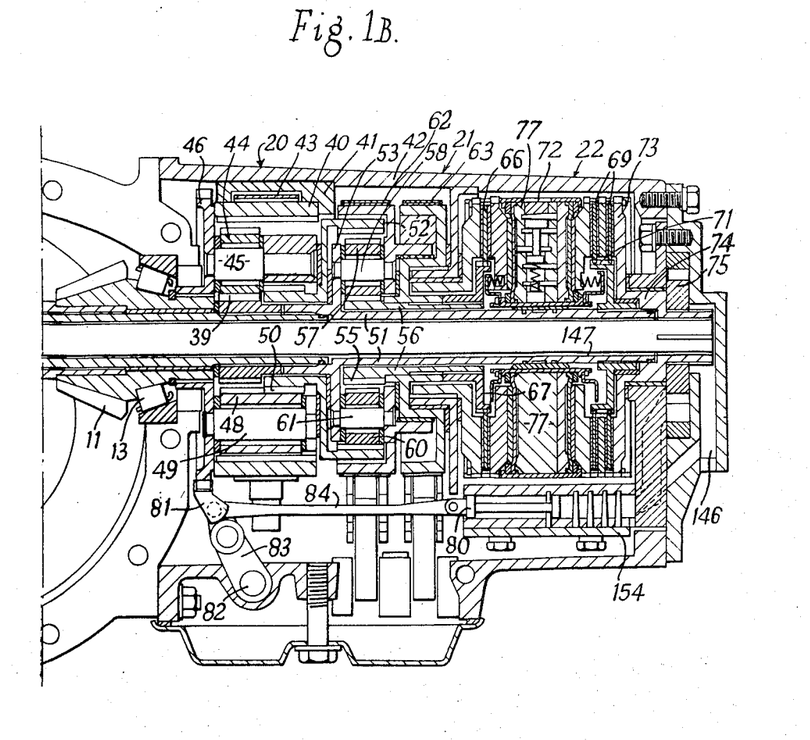

In FIGURE 1 the axle 10 of the driving wheels of a motor vehicle is shown and the transmission apparatus of the invention is mounted transverse to this axle. The axle 10 carries a bevel wheel (not shown) driven by a bevel pinion 11 constituting the output member of the transmission apparatus. This bevel pinion 10 is fixed on a sleeve 12 and is mounted in bearings 13 and 14.

The engine crankshaft 15 drives the bevel wheel 11 through the transmission apparatus which comprises inner and outer drive shaft 17, 18 extending transversely across the axle 10, a first power transmitting device in the form of a fluid torque converter 19 on one side of the axle 10, and on the other side of the axle gearing comprising a first planetary gear 20, a second planetary gear 21, and a unit 22 containing two further power transmitting devices in the form of friction clutches together with control valves for hydraulically controlling these clutches.

The engine crankshaft 15 is fixed to a plate 24 that carries the usual starter pinion 25 and the plate 16 is fixed by parts 26, 27 to the inner drive shaft 17. The plate 24 is also fixed to the housing 28 of the torque converter 19 which housing 28 carries the impeller 30 of the torque converter. The turbine 31 of the torque converter is mounted on a hub 32 which is splined on the outer drive shaft 18. The stator 33 is mounted on a unidirectional detent or brake 34, the inner member 35 of which is fixed to the fixed casing 36.

The planetary gear 20 comprises a sunwheel 39 fixed on the outer drive shaft 18 which constitutes a first input drive element; an internally toothed ring gear 40 rotatably mounted in a bearing block 41 carried by the casing 42 of the transmission apparatus; a brake 43 acting on the ring gear 40 (to provide reverse drive); a planetary pinion 44, the spindle 45 of which is carried by a rotatable cage 46 which is an output driving member fixed to the bevel wheel 11; a planetary pinion 48, the spindle 49 of which is carried also by the cage 46 and which pinion meshes both with the pinion 44 and ring gear 40; and an input reaction drive member in the form of a sunwheel 50 which meshes with the pinion 48 and can be held fixed or driven at either of three (two indirect and one direct) ratios by the second planetary gear 21. Each of the planet pinions in the first and second planetary gears may be in sets although only one of each is shown.

The second planetary gear 21 comprises a ring gear 52 fixed to the sunwheel 50; a cage 53 carried by a sleeve 51 which constitutes a second input drive element; a sunwheel 55 carried by a sleeve 56 which constitutes a third input drive element; planet pinion 57 on spindle 58 carried by cage 53 and in mesh with sunwheel 55; planet pinion 60 on spindle 61 also carried by cage 53 and meshing both with the pinion 57 and with the ring gear 52. A brake 62 can hold the cage 53 for reaction and a brake 63 can hold the sleeve 56.

The clutch unit 22 has one clutch provided with a spinner plate 66 carried by a hub 67 fixed on the sleeve 56; and a second clutch having two spinner plates 69 carried by a hub 71 fixed on the sleeve 51. These clutches are mounted in a clutch housing 72 carried by a plate 73 fixed on the inner drive shaft 17. Thus the shaft 17 can be selectively coupled by these clutches to either or both of the input drive sleeves 51, 56.

The clutches may be of generally known construction applied by oil pressure from a pump 75 driven by shaft 17 and are disengaged by springs. The oil supply to the cluches and brakes is controlled by control valves spaced apart angularly in a valve body 77 in the clutch cylinder 72.

A manually controlled selector valve 80 provides the following positions, viz. Forward, Engine Braking, Neutral, Reverse and Parking Lock. The parking lock device is shown at 81. The selector valve is actuated by shaft 82, lever 83 and rod 84.

The brakes 42, 43 ay be of the well known single or double wrap types partially self energising or made wholly self energising so as to automatically lock in the reaction direction and free in the forward running direction or overrunning detents may be used as will be described.

The general operation of the transmission is as follows. Neutral is obtained when all brakes and clutches are disengaged. Forward is obtained when brakes 62, 63 are engaged and reverse when brake 43 is engaged. The first range of ratios is provided with the clutches disengaged and members 51, 56 stationary and serving as reaction elements. All the power passes through the torque converter. The first gear train 20 may provide a ratio of 2.22:1 and the torque converter a maximum torque ratio of 2:1 giving a starting ratio of 4.44:1. As drive commences the torque converter ratio will decrease automatically until the overall ratio approaches 2.22:1. The second range of ratios is provided when clutch 66 is engaged, brake 63 becoming disengaged. The ratio of the combined gearing may be 1.58:1. In this range the torque converter transmits .71 of the input torque, the clutch 66 and the second gear train the remaining .29. As sunwheel 50 is now driven the relative speeds in the output gear train are reduced. The third range of ratios is provided when clutch 69 is engaged and the brake 63 becomes engaged. The ratio of the gearing becomes 1.225:1. The torque converter transmits .55 of the input torque and the clutch 69 and second gear train .45. Sunwheel 50 is driven at increased speed and relative speeds in the output gear train reduced. Fourth range of ratios is provided when both clutches 66, 69 are engaged and both brakes 62, 63 become free.

In this range the torque converter transmits .45 of the input torque, clutch 66 now transmits .17 and clutch 69 .38. The second gear train 21 now rotates without relative motion and sunwheel 50 at input speed. Sunwheel 39 rotates at a somewhat slower speed if the overall ratio is less than 1:1.

To provide a ratio mid-way between 1.225:1 and 1:1, i.e. 1.105:1 the torque converter must operate at 1.27:1 which is close to the most efficient point in the torque conversion range. Loss of efficiency is reduced by reason of the divided torque. For example, if there is a slip and loss in the converter of 6%, i.e. at total power, this is reduced to 6×.45=2.7% because of the reduced torque. Percentage loss of the total power, however, is 2.7×.45=1.2%. The capacity of the torque converter may be reduced by reducing the size. The torque capacity may be reduced by 58% and the loss is then reduced according to the division of torque, i.e. 6% loss is reduced to 2.7% loss. Reduction in the capacity of the converter permits increased input speeds at the lower end of the range where the torque carried is greater. This increases the power available by one third without increasing slip at the higher end of the range. The arrangement not only substantially improves performance but greatly reduces drag and motoring torque at idling and low speeds.

Figure 2:
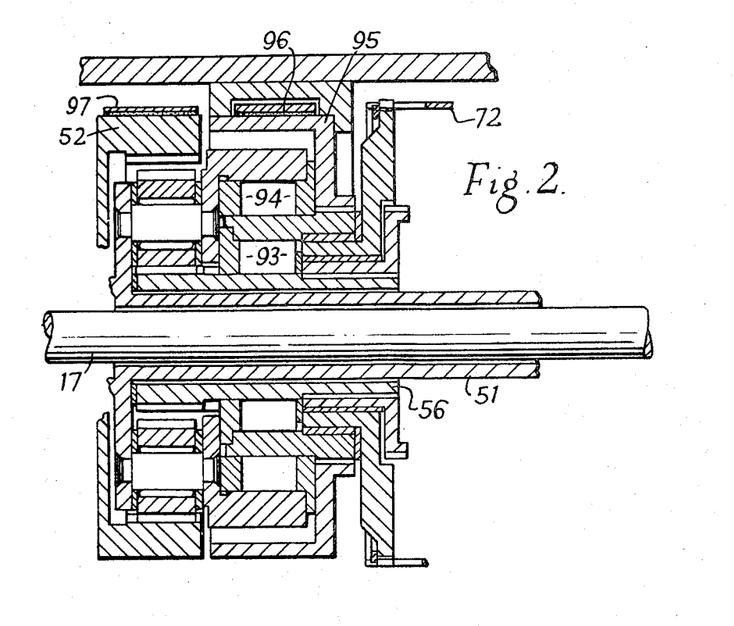
FIGURE 2 is a sectional view of part of FIGURE 1 but showing a modified construction.

In the modification illustrated in FIGURE 2 the members 51, 56 are provided with one way detents 93, 94 which act on member 95. A brake 96 can hold 95 for forward running and a brake 97 to hold member 52 for engine braking replace brakes 63, 62. All changes are made by engagement and disengagement of the two clutches. There are no timing or locking up difficulties. In changing from first to second range clutch 66 is engaged. The changes between the ranges are completely self timing with no possibility of reversal of drive. In changing between second and third ranges, some overlap between the clutches for up change is necessary but if this is excessive the unit tends momentarily to engage fourth range again avoiding possibility of reversal of drive. The change between third and fourth ranges is completely self timing. This feature provides greatest possible smoothness and continuity of drive.

Band brakes as is well known are self energising and provide good "up" disengaging changes and good "down" engaging changes as the self timing feature referred to is approached. The self energising effect, however, acts against a good "up" engaging change.

Figure 3:
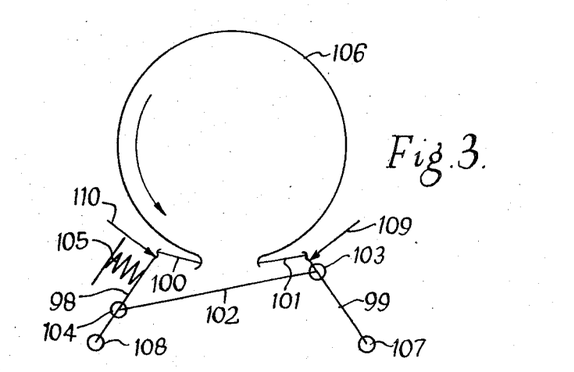
FIGURE 3 is a geometric view of a brake device suitable for use with the apparatus of FIGURE 1.
Figure 4:
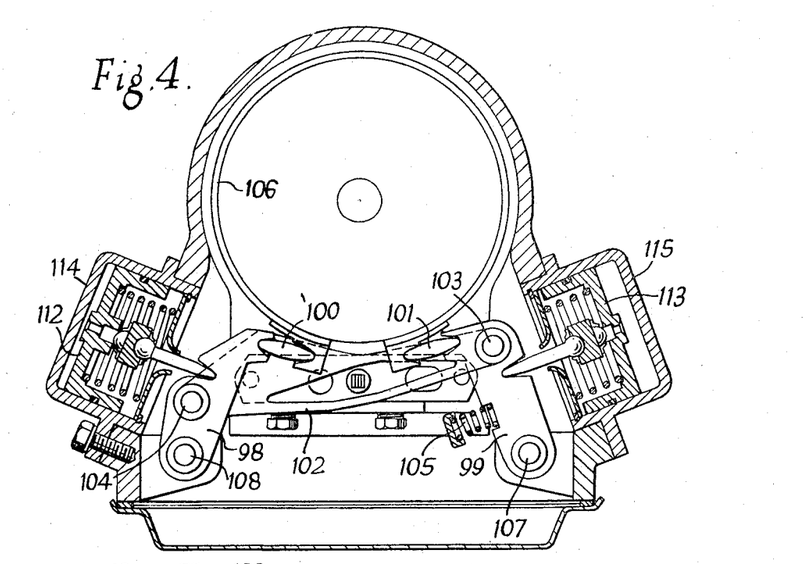
FIGURE 4 is a sectional view of the device shown in FIGURE 3.

The brakes may be arranged to be completely self timing by means of the brake operating device shown in FIGURES 3 and 4, the engaging pins 100, 101 connect the ends of the brake band 106 to levers 98, 99. These are connected together by rod 102 pivoted at 103, 104. The levers 98, 99 are mounted on fixed pivots 107, 108. If the load on the band is in the direction of the arrow, the load at the so-called anchor point 101 will, due to the self wrapping action, be greater than the load at the apply point 100. The lever 99 therefore tends to move to the right. The tie point 103 is, however, further from the pivot point 107 than is the point 104 from the pivot point 108. Therefore, as the levers 98, 99 move to the right the points 100, 101 come closer together applying more load to the band. Load in the opposite direction moves the assembly to the left thereby opening the points 100, 101 and freeing the brake. A spring 105 may apply slight load and drag so that the brake will engage as soon as there is movement in the direction of the arrow. Means may be provided to apply a load at point 109 whereby the levers are moved slightly to the left and the brake is then free and cannot engage. If load is applied in the direction of the arrow 110, the levers 100, 101 are brought closer together and the brake is applied even though the direction of rotation is opposite to that shown by the arrow and the brake can be used for engine braking. If during operation such a load be applied after the brake has become engaged for reaction and removed before the brake requires to automatically free for over-run, the ratio changes can be self timing and the brake also used to hold the ratio fixed for engine braking, etc. The loads may be applied by pistons such as 112, 113 (FIGURE 4) in cylinders such as 114, 115. In FIGURE 2 one piston is arranged to load both brakes but each brake may be loaded independently. One piston may hold both brakes in neutral or free position.

Figures 5, 6:
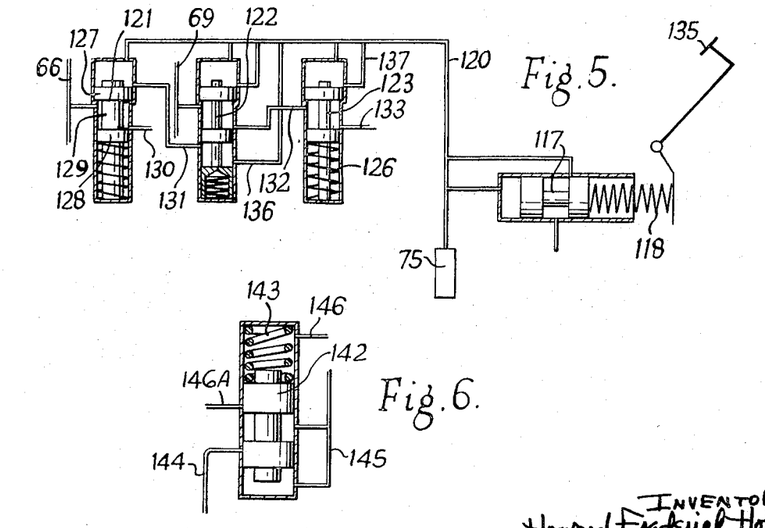
FIGURE 5 is a diagram of control valves and hydraulic circuit for use with the apparatus of FIGURE 1.
FIGURE 6 is a sectional view of a clutch pressure regulator valve to be described.

The invention permits substantial simplification of the controls. A hydraulic circuit and automatic controls are shown in FIGURE 5. The pump 75 applies oil pressure to a line 120 which is controlled by relief valve 117 and spring 118. The load on the spring 118 and hence the pressure is varied by connection to the throttle control pedal 135 of the engine. The valves 121, 122, 123 are carried in the valve body 77 and are subjected to centrifugal force which tends to move the valves outwards. The pressure in line 120 acts on the outer ends of the valves tending to cause inwards movement. Springs 124, 125, 126 assist centrifugal force, acting in the outwards direction. The valve 121 is heavier than the valve 122 which is again heavier than 123 and the ratio changes occur at increasing speeds, i.e. the engine can run faster in second range of ratios than in first, and still faster in third range. In operation as soon as speed is sufficient for the spring together with centrifugal force to exceed oil pressure force the valve moves outwards. The land 127 is of greater area than the land 128 so that as soon as line pressure is opened through 136, 131 to space 129 (i.e. the change is about to take place) more load is applied in the outwards direction to the land 127 than in the inwards direction to the land 128 and the valve snaps over. The valve cannot now move inwards until speed is reduced as this unbalanced force assists centrifugal and spring force. On moving inwards at reduced speeds, when exhaust 130 is opened, the pressure in space 129 is released and the valve snaps inwards. The areas of the lands 127, 128 determine the differences between up and down changes. By varying the pressure in line 120 the speeds of both up and down changes are varied. The line pressure may also provide suitable pressures to engage the clutches according to throttle opening and load, and the weight, areas and spring load will be selected to provide a suitable change speed pattern. In sequence, valve 121 moves outward engaging clutch 66. At higher speeds provided line pressure remains the same, valve 122 moves outward engaging clutch 69 but disengaging clutch 66 as line 131 is closed to 120 and opened to 132 and exhaust 133. At higher speeds valve 123 moves outward re-engaging clutch 66 through lines 137, 132, 131.

For highest speed changes pressure in line 120 is at maximum and this may become excessive for clutch engagement and the clutches may be provided with low flow regulator valves of known type as shown in FIGURE 6. The valve 142 is loaded by spring 143 and has an inlet 144 from the clutch line such as 66 and an outlet 145 leading to the clutch. 146 and 146A are exhausts. Increased pressure in line 145 moves the valve towards exhaust 146A and decreased pressure allows the valve to move towards inlet 144 thereby maintaining a pressure determined by the load on the spring 143. The valve may be arranged, however, so that centrifugal force may act on the valve against the spring 143 thereby reducing pressure to a lower maximum at higher speeds. The line pressure may also be used to charge the torque converter through spaces 147, 146 (FIGURE 1).

Figure 7:
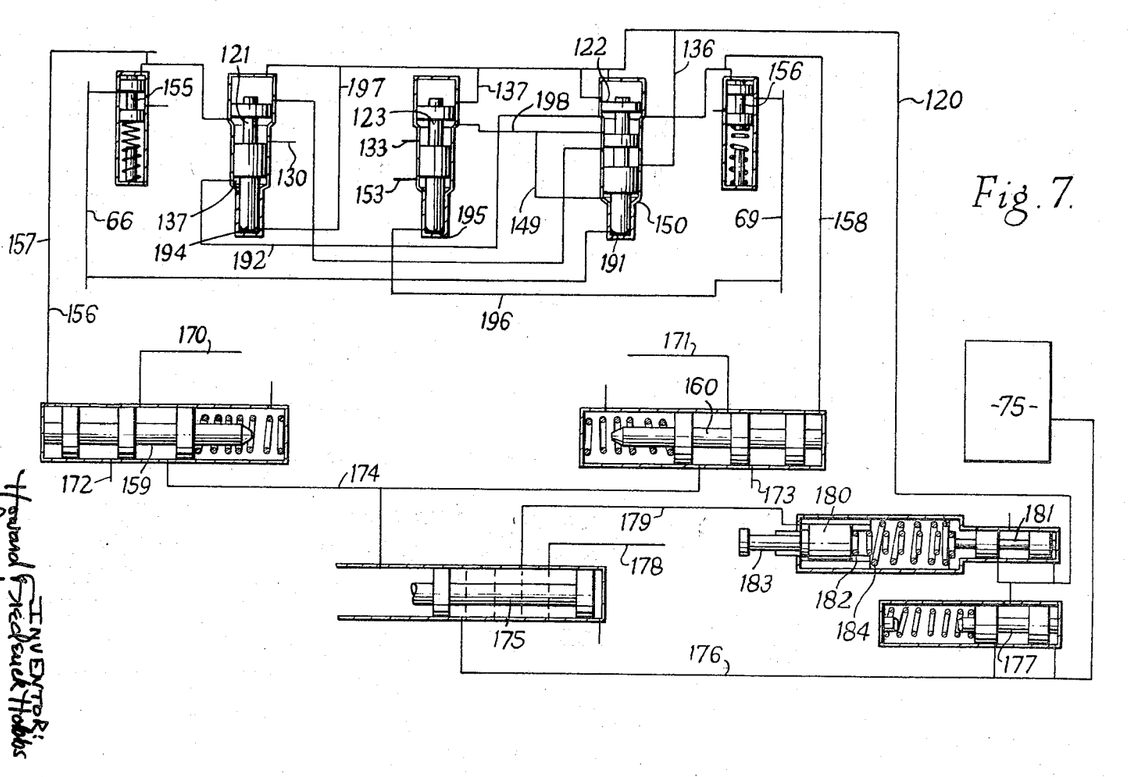
FIGURE 7 is a diagram of a modified system of control valves and hydraulic circuit.

In the modification shown in FIGURE 7 the valves 121, 122, 123 operate in a similar manner but the circuit is interlocking and changes between ranges need not occur at different speeds. Line 197 leads permanently to area 194 assisting centrifugal force but pressure is not led to area 191 until valve 121 moves outwards, opening pressure to valve 155 which moves inwards allowing pressure to reach line 66 leading to one clutch, and valve 122, therefore, does not move until pressure builds up in the clutch. As soon as valve 122 has moved outwards and pressure is led to valve 156 and line 69 leading to the other clutch, line 196 receives pressure and applies it to space 195 so that valve 123 may move outwards. There is now greater pressure holding 121 outwards than can be applied to move it inwards. It cannot move, therefore, until after 122 has moved inwards allowing pressure from the line 192 to be exhausted through 198 and exhaust 133. Valve 122 cannot move inwards if valve 123 is out as space 150 is pressurised through lines 137, 198, 149. Valve 123 does not move out until clutch 69 is engaged and pressure reaches space 195 through line 196. Exhaust 153 remains permanently open. The clutches are provided with exhausting valves 155, 156. These valves also serve to maintain local pressure to immediately pressurise lines 157, 158. Lines 157, 158 lead to valves 159, 160 which are situated in the valve block 154, FIGURE 1, and which direct pressure to and exhaust lines 170, 171 from the cylinders loading the brakes 62, 63. Exhausts 172, 173 are provided and pressure is led to the valves by line 174.

The selector valve 175 shown in parking lock position receives oil pressure via line 176 from pump 75 and this pressure is controlled by relief valve 177. Pressure from line 176 is directed to line 178 to apply brake 43 for reverse and to line 179 to act on piston 180 and hold springs 182, 184 compressed to provide the maximum pressure from clutch relief valve 181 in line 120 so that valves 121, 122, 123 cannot move outwards in Park, Reverse and Neutral. Pin 183 is connected to the throttle control of the engine and provides variable pressures and higher pressures for "Kick-down" when spring 184 is brought into action. The pin 183 may be mechanically positioned by the control lever so that ratios are caused to change at higher speeds irrespective of throttle opening. This provides engine braking. Alternatively, a line from valve 175 can engage brake 97, FIGURE 3, for fixed low "gear" braking.

Figures 8, 9:
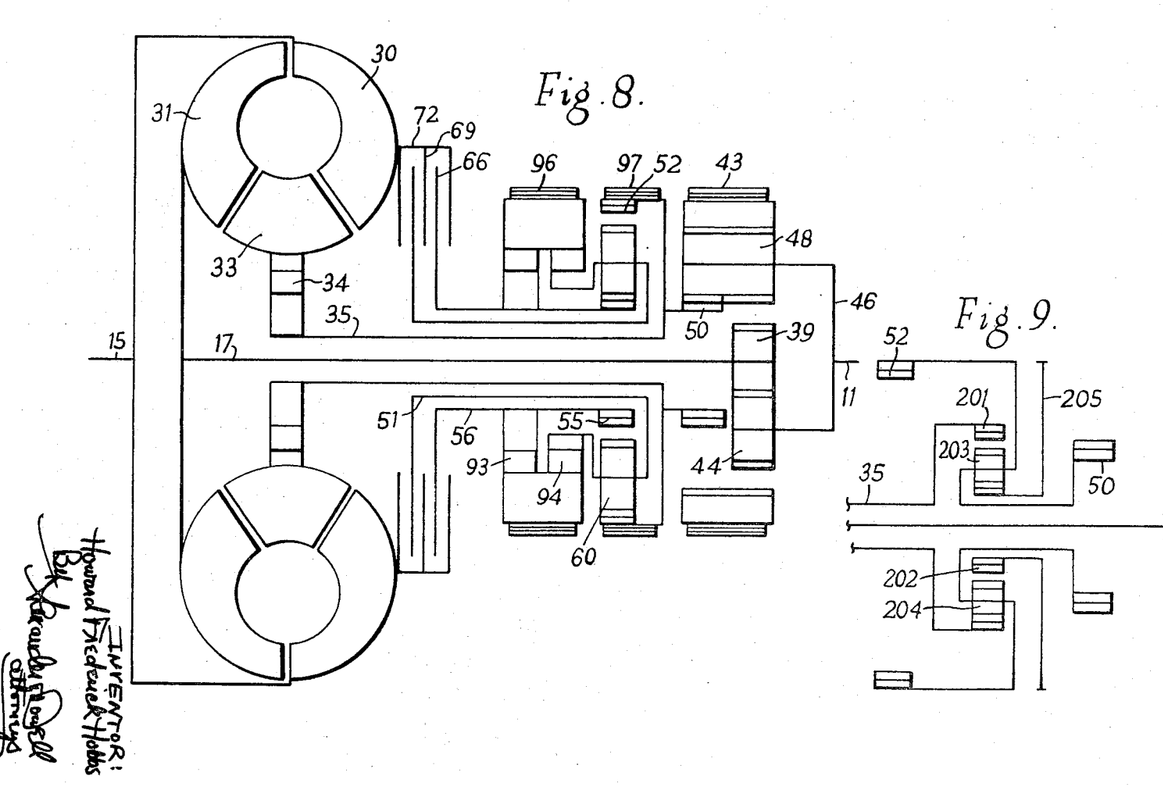
FIGURE 8 is a view similar to FIGURE 1 but showing a modified construction.
FIGURE 9 shows a portion of FIGURE 8 but of modified construction.

FIGURE 8 is a diagrammatic layout of a transmission made according to the invention which operates generally as already described with reference to FIGURE 1 as modified by FIGURE 3. The reaction element 20 of the torque converter is connected by sleeve 35 to 50–52, i.e. the reaction element of the output gear train and the driven element of the second gear train. The converter works in the normal way in first range reacting through detent brakes 34, 93, 94. In second range the reactor 33 is driven forwards slowly, in third range faster and in fourth range at input speed. This improves the efficiency of the close ratio end of the converter range in second and third ranges as the coupling point becomes closer to 1:1 ratio. Increased reactor blade exit angle can be used thereby reducing coupling slip. As there is no reaction point in fourth range no torque conversion can take place. The reactor becomes an input member. If an additional gear train is added as shown in FIGURE 9, 201, 202, 203, 204, the gear 202 can react if held at 205 and torque conversion can take place in fourth range. Detent 34 can be situated at 205.

Sleeve 35 may be connected to the carrier of the output gear train or through gearing such as shown in FIGURE 9 carried by the impeller 30 to a reaction point.

Figure 10:
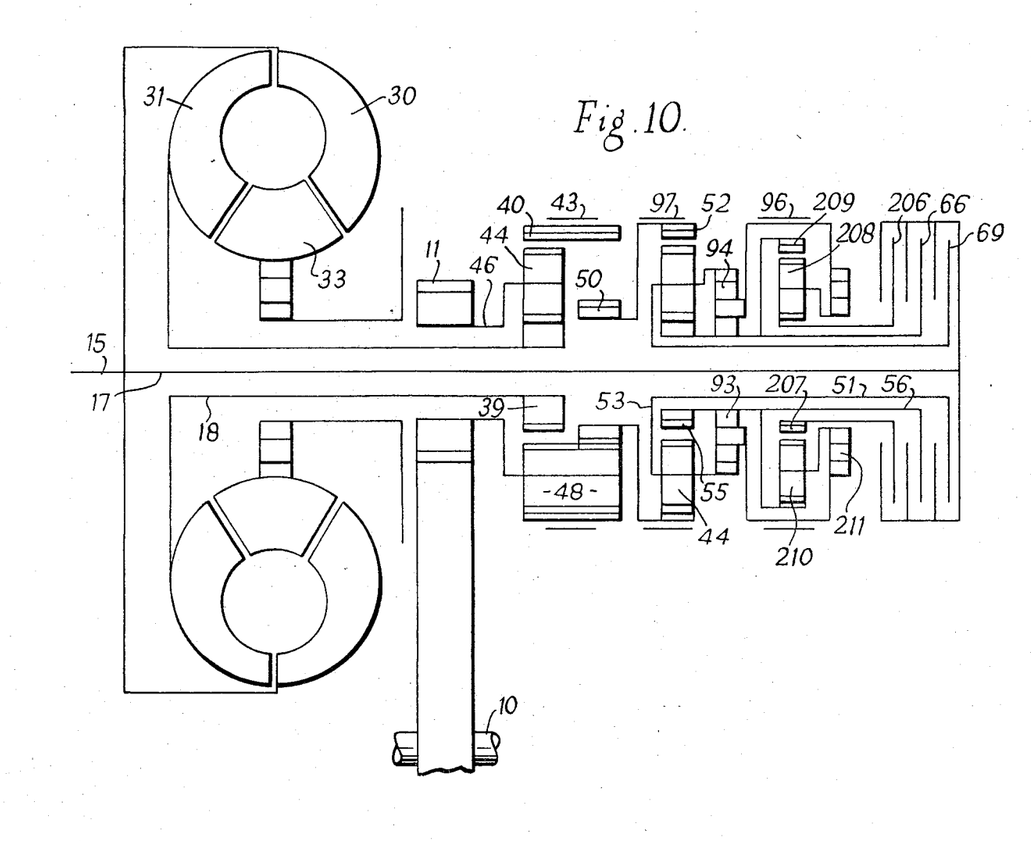
FIGURES 10 and 11 are further views similar to FIGURE 1 but showing further modifications.

FIGURE 10 is a diagrammatic drawing of a six range transmission made in accordance with the invention and arranged for a transverse engine installation. Clutch 206, gear train 207, 208, 209, 210 and detent or brake 211 is added. In operation brake 96 is engaged for forward running. For first range no clutches are engaged. For second range clutch 206 is engaged, for third range clutch 66 is engaged, for fourth range clutch 69 is engaged, for fifth range clutches 69, 206 are engaged and for sixth range clutches 206, 66, 69 are engaged. An additional ratio change valve such as 122 is required. Brakes as shown in FIGURE 4 may be used instead of one way detents.

The gear trains shown and described enable close, evenly spaced ratios to be obtained but other types of gear train may be used particularly when a wider range of ratios is required.

Figure 11:
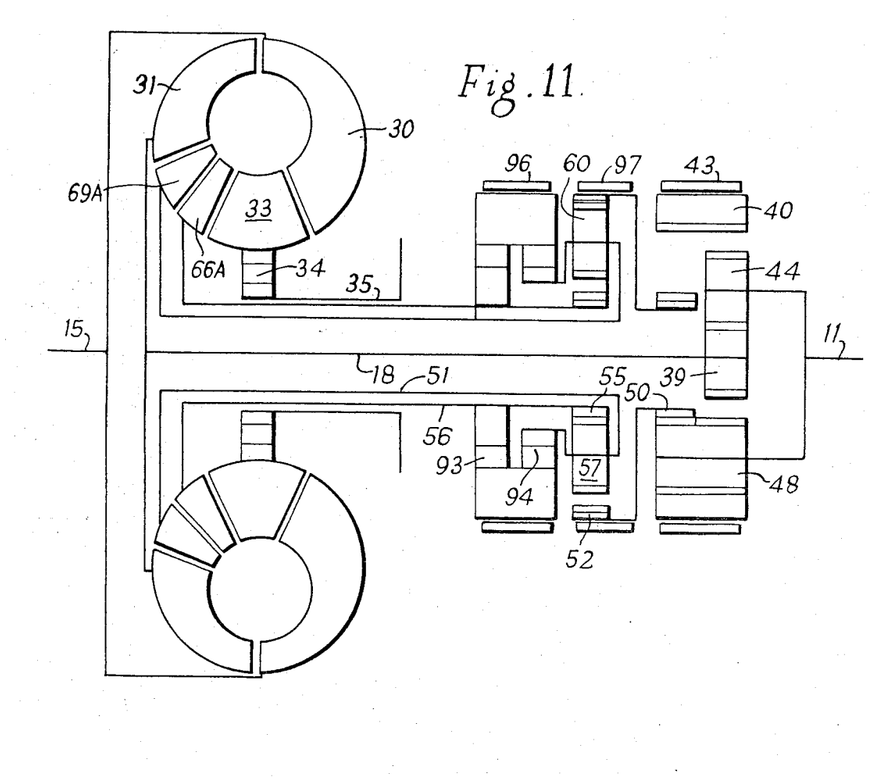

FIGURE 11 is a diagrammatic drawing of an infinitely variable transmission made according to the invention and all three of the input members are provided with couplings which during some phases of operation may provide torque conversion. The couplings or torque converters are combined and contained within one housing.

The layout is generally similar to that shown in FIGURE 8 with the exception that the clutches 66, 69 are replaced by the additional torque converter elements 66A, 69A, and the sleeve 35 is attached to the stationary housing.

The elements serve both as input and reaction elements and the blades of the elements 16, 15 may be of resilient material and so anchored as to automatically take up different curvature under the oil load. The blades may be arranged to pivot.

In operation at low speeds the oil flow from 31 is in a backwards direction, i.e. opposite to the direction of movement of 31 and 66A, 69A act as reaction elements, at higher speeds of 31 the flow changes to a forwards direction and 69A acts as an input member, the flow from 69A is in a backwards direction. At still higher speeds and when 69A rotates at increased speeds the flow from 69A changes to a forward direction and 66A becomes an input member. Finally, all three members act as couplings. The power is divided through the different paths and gearing as already described.

Over the greater part of the range element 31 will act as a coupling and transmit part of the torque as already described.

To provide a free neutral a clutch may be provided in one of the paths or in the output shaft.

The various arrangements shown can be combined. One friction clutch and one additional torque converter element may, for example, be used. One or both of the two friction clutches may be replaced by fluid torque converters or fluid clutches which may be filled or emptied in known manner.

The torque converter may be replaced by a fluid clutch, magnetic powder coupling or friction clutch.

I claim:

1. A power transmission apparatus comprising a primary input member (15), an output part (11), a fixed part (42), a hydro-kinetic torque transmitting device (19) having an impeller (30) and at least one turbine (31), a toothed gearing comprising a primary planetary gearing and a secondary planetary gearing, said primary planetary gearing including an input member (39) and an output member (49) and a reaction member (50), said secondary planetary gearing having a plurality of input members (53, 56) and an output member (52) and reaction parts (61, 62), a plurality of additional torque transmitting devices which include driving parts and driven parts (66, 69), a plurality of brakes of the self-energizing kind (62, 63), means connecting the said impeller drivably to the primary input member (15), means permanently connecting the said turbine at all times to the input gear (39) of said primary planetary gearing, means connecting the driven member (45) of said primary planetary gearing to said output part (11), means connecting the reaction member (50) of said primary planetary gearing at all times to the output member (52) of said secondary planetary gearing, said primary planetary gearing and said secondary planetary gearing having no other mechanical connection to each other, means connecting the driven parts (66, 69) of said additional torque transmitting devices drivably to said input members (53, 56) of said secondary planetary gearing and which input members act at times as input members, the driving parts of said additional torque transmitting devices comprising a common housing (72, 73), means drivably connecting said driving parts to said primary input member (15), means connecting the rotating parts of said brakes to said reaction parts (61, 62) of said secondary planetary gearing, which act at times as reaction members to react against said fixed part, to enable the input members of said secondary planetary gearing to be freed from and engaged with said primary input member independently and simultaneously in parallel with each other and simultaneously in parallel with said hydro-kinetic torque transmitting device to divide the torque in different proportions between a plurality of power paths and the components of the torque transmitting devices and reaction elements of said secondary gearing to be freed from and engage with said fixed part independently and simultaneously in parallel to hold said reaction member of said primary planetary gearing through said secondary gearing and provide a plurality of torque ratios and changes between one and another ratio or series of ratios without interruption and in a uni-directional manner without possibility of reversal of drive.

2. A power transmission apparatus as claimed in claim 1 in which said secondary planetary gearing comprises a sun gear (55), a ring gear (52) and two sets of planet pinions (57, 60), one set (57) meshing with the sun gear (55) and one set (60) meshing with the ring gear (52), the two sets of pinions (57, 60) meshing with each other.

3. A power transmission as claimed in claim 1 wherein the primary gear train includes a sun-wheel (50), planet pinions in mesh with the sun-wheel and a ring gear in mesh with the planet pinions, and means (43) are provided for holding the ring gear stationary for reversal of drive only and releasing it when required.

4. A power transmission apparatus according to claim 1, in which said additional torque transmitting devices comprise at least two friction clutches.

5. A power transmission apparatus according to claim 1, in which the additional torque transmitting devices include elements of the hydro-kinetic torque transmitting device (31, 69A, 66A, FIGURE 11).

6. A power transmission apparatus according to claim 5, having a plurality of input connecting members (18, 51, 56) connecting the elements of the hydro-kinetic torque transmitting device to parts of the toothed gearing at all times, at least one of said elements ceasing to drive its input connecting member during one phase of operation whereupon this input connecting member then serves as a reaction member.

7. Power transmission apparatus according to claim 1, having at least 1 one-way detent (93, 94) to anchor a part of the toothed gearing (95, 51, 56, FIGURE 2) so that said part serves for reaction.

8. Power transmission apparatus as claimed in claim 1 having reaction brakes acting on parts of said toothed gearing, at least one of the brakes being a band brake (63), said band brake having an apply part (100, FIGURE 3) and an anchor part (101) both which parts of the band are movable, connecting means (102) being provided which connect the apply point of the band with the anchor point whereby engaging movement of the anchor point is transmitted to the apply point to draw the anchor point and apply point relatively towards each other so that the brake is substantially self applying.

9. Power transmission apparatus according to claim 8, having means (112, 114, 115, 113, FIGURE 4) whereby the brake band can be moved to and held out of the self applying condition.

10. Power transmission apparatus according to claim 8, having means (112, 114) whereby the band can be loaded so as to engage the brake when not rotating in the self applying direction.

11. Power transmission apparatus according to claim 5, in which the blades of at least one of the torque converter elements are of resilient material and able to deflect under oil load.

12. Power transmission apparatus according to claim 4, having a rotary housing (77) carrying said clutches, control valves (121, 122, 123, FIGURE 5) radially disposed in the housing (77) and moved outwards at least partly by centrifugal force, means to apply oil pressure to said valves to move them inwards whereby said valves direct oil pressure to and exhaust oil pressure from the clutches for actuating them.

13. Power transmission apparatus according to claim 4, having a rotary housing (77) carrying said clutches, control valves (121, 122, 123, FIGURE 5) radially disposed in the housing (77) and moved outwards at least partly by centrifugal force, means to apply oil pressure to said valves to move them inwards whereby said valves direct oil pressure to and exhaust oil pressure from the clutches for actuating them, said means to apply oil pressure including an oil supply channel which provides oil both for effecting ratio changes and also to engage the friction clutches.

14. Power transmission apparatus according to claim 4, having a rotary housing (77) carrying said clutches, control valves (121, 122, 123, FIGURE 5) radially disposed in the housing (77) and moved outwards at least partly by centrifugal force, means to apply oil pressure to said valves to move them inwards whereby said valves direct oil pressure to and exhaust oil pressure from the clutches for actuating them, and regulator valves (142) disposed radially in the rotary housing (77) so that centrifugal force acts on the valves to cause reduction in pressure with increased speed.

15. Power transmission apparatus according to claim 1 wherein the hydro-kinetic torque transmitting means has a reaction part (33) connected with a reaction part (96) of the secondary planetary gearing (52–60).

16. Power transmission apparatus as claimed in claim 4 having a rotary housing (77) carrying said clutches control valves (121, 122, 123, FIGURE 5) radially disposed in the housing (77) and moved outwards at least partly by centrifugal force, means to apply oil pressure to said valves to move them inwards whereby said valves direct oil pressure to and exhaust oil pressure from the clutches for actuating them, a selector valve, a spring loaded relief valve (181) controlled by said selector valve, said relief valve controlling the pressure supply to the control valves for moving them inwards, said selector valve in at least one position directing fluid pressure to the relief valve to compress the relief valve spring (184) whereby high pressure is maintained on the control valves (121, 122, 123) to maintain them in their inner positions.

References Cited

UNITED STATES PATENTS

| | | | |
|---|---|---|---|
| 2,546,378 | 3/1951 | Winther | 74—759 |
| 2,572,007 | 10/1951 | Burtnett | 74—688 |
| 2,620,685 | 12/1952 | Smirl | 74—759 |
| 2,651,950 | 9/1953 | Schou | 74—759 |
| 2,821,867 | 2/1958 | Kelbel | 74—688 |
| 2,853,167 | 9/1958 | Kelly | 192—87.12 |
| 3,000,234 | 9/1961 | Burtnett | 74—688 |
| 3,006,217 | 10/1961 | Dodge | 74—677 |
| 3,020,781 | 2/1962 | Burtnett | 74—688 |
| 3,051,017 | 8/1962 | Flinn | 74—677 |
| 3,173,310 | 3/1965 | Moan | 74—759 |
| 3,217,562 | 11/1965 | Stockton | 74—677 |
| 3,263,526 | 8/1966 | Stockton | 74—688 |
| 3,295,392 | 1/1967 | Scheiter | 74—677 |
| 3,299,739 | 1/1967 | Stockton | 74—688 |

FOREIGN PATENTS

| | | |
|---|---|---|
| 236,182 | 10/1964 | Austria. |
| 962,463 | 7/1964 | Great Britain. |

DONLEY J. STOCKING, *Primary Examiner.*

THOMAS C. PERRY, *Examiner.*